(12) United States Patent
Seff et al.

(10) Patent No.: US 7,570,481 B2
(45) Date of Patent: Aug. 4, 2009

(54) POWER PEDESTAL AND BASE ASSEMBLY THEREFOR

(75) Inventors: Paul D. Seff, Williamsburg, VA (US);
Alston G. Brooks, Grafton, VA (US);
Gregory S. Nailler, Canonsburg, PA (US)

(73) Assignee: Eaton Corporation, Cleveland, OH (US)

( * ) Notice: Subject to any disclaimer, the term of this patent is extended or adjusted under 35 U.S.C. 154(b) by 14 days.

(21) Appl. No.: 11/734,518

(22) Filed: Apr. 12, 2007

(65) Prior Publication Data

US 2008/0253062 A1    Oct. 16, 2008

(51) Int. Cl.
*H02B 1/26* (2006.01)
*H05K 7/02* (2006.01)
*A47B 81/00* (2006.01)
*H01R 13/502* (2006.01)

(52) U.S. Cl. .............. 361/624; 174/541; 174/560; 361/637; 361/641; 312/223.6

(58) Field of Classification Search .............. 361/622, 361/624, 637, 641; 312/223.6; 174/541, 174/560
See application file for complete search history.

(56) References Cited

U.S. PATENT DOCUMENTS

| | | | | |
|---|---|---|---|---|
| 2,985,261 A | * | 5/1961 | Kubesh | .......... 52/120 |
| 3,225,224 A | * | 12/1965 | Rydbeck | .......... 307/157 |
| 3,341,268 A | | 9/1967 | Bickford et al. | |
| 3,562,594 A | * | 2/1971 | Jones et al. | .......... 361/660 |
| 3,596,141 A | * | 7/1971 | Jones et al. | .......... 361/664 |
| 4,307,436 A | * | 12/1981 | Eckart et al. | .......... 361/652 |
| 4,365,108 A | * | 12/1982 | Bright | .......... 174/50 |
| 4,507,715 A | * | 3/1985 | Wedding | .......... 362/153 |
| 4,519,657 A | | 5/1985 | Jensen | |
| 4,546,418 A | | 10/1985 | Baggio et al. | |
| 4,785,376 A | | 11/1988 | Dively | |
| 4,873,600 A | * | 10/1989 | Vogele | .......... 361/823 |
| 4,892,978 A | * | 1/1990 | Axworthy | .......... 174/38 |
| 4,951,182 A | | 8/1990 | Simonson et al. | |
| 5,232,277 A | | 8/1993 | Cassady | |

(Continued)

OTHER PUBLICATIONS

The HyPower Advantage, Mar. 6, 2007, pp. 1-3, http://www.powerpedestal.com/powercenters.php.

(Continued)

*Primary Examiner*—Jayprakash N Gandhi
*Assistant Examiner*—Bradley H Thomas
(74) *Attorney, Agent, or Firm*—Martin J. Moran

(57) ABSTRACT

A base assembly is provided for a power pedestal including an elongated housing and a plurality of electrical conductors enclosable by the elongated housing. The elongated housing has a first end and a second end disposed opposite and distal from the first end. The base assembly includes a power pedestal base member having a first end and a second end disposed opposite and distal from the first end. The second end of the base member is structured to be coupled to a platform. A connecting mechanism, such as a hinge assembly, is disposed at or about the first end of the base member and removably couples the first end of the elongated housing to the base member without a number of separate fasteners, thereby facilitating removal of the elongated housing from the base member. An electrical bus mount may be removably coupled to a mounting surface of the base member.

7 Claims, 6 Drawing Sheets

U.S. PATENT DOCUMENTS

| | | | | |
|---|---|---|---|---|
| 5,838,078 | A * | 11/1998 | Tipton | 307/147 |
| 6,501,015 | B2 * | 12/2002 | Maloney et al. | 174/17 VA |
| 6,742,748 | B1 * | 6/2004 | Gretz | 248/156 |
| 6,844,716 | B1 | 1/2005 | Lundberg et al. | |
| 6,879,490 | B2 * | 4/2005 | Mattei et al. | 361/727 |
| 7,004,786 | B1 * | 2/2006 | Bloom et al. | 439/501 |
| 7,090,382 | B2 * | 8/2006 | Haddad et al. | 362/431 |
| 2007/0284370 | A1 * | 12/2007 | Dively | 220/3.8 |

OTHER PUBLICATIONS

The HyPower Advantage, Mar. 6, 2007, pp. 1-2, http://www.powerpedestal.com/index.php.

* cited by examiner

POWER PEDESTAL AND BASE ASSEMBLY THEREFOR

BACKGROUND OF THE INVENTION

1. Field of the Invention

The invention relates generally to power pedestals and, more particularly, to base assemblies for power pedestals.

2. Background Information

Electrical components (e.g., without limitation, relays; circuit breakers; electric meters; transformers; light fixtures; power receptacles; telephones; telephone and/or Internet service lines and electrical connectors therefor; television cables and electrical connectors therefor) used outdoors are typically housed within an enclosure, such as, for example, a housing, such as a box or cabinet, to protect the electrical components from the environment and to prevent electrical faults caused by moisture. In some applications, the outdoor electrical enclosure is mounted to another structure whereas in other applications the outdoor electrical enclosure is free-standing, meaning that it is generally independent from other structures.

One type of free-standing outdoor electrical enclosure, which is generally old and well known in the art, is the power pedestal. Power pedestals generally comprise an upstanding housing, the base of which is disposed on a dock, a pier, or any other suitable foundation (e.g., platform), and is structured to receive, for example and without limitation, power cables, telephone lines, television cables, Internet service lines, and water service lines. The housing is made from a weather-resistant material, such as a suitable plastic or metal (e.g., without limitation, stainless steel), and is designed to enclose the power cables, lines and other cables, and the electrical components, receptacles and connectors which are electrically connected to the lines, in order to shield and protect them from the environment. Accordingly, power pedestals are well suited for use in environments such as marinas and recreational vehicle (RV) parks, where they must remain outdoors exposed to environmental elements as they serve to provide plug-in power and/or connectivity (e.g., without limitation, telephone service; Internet service; cable television; water service), for example, for boats and RVs and other vehicles. Examples of power pedestals are provided in U.S. Pat. Nos. 4,519,657; 4,546,418; 4,785,376; 4,873,600; and 4,951,182.

Accordingly, it will be appreciated that many of the locations and environments in which power pedestals are employed are subject to storm conditions (e.g., without limitation, hurricanes; tornadoes; cyclones; hail storms; thunderstorms; wind storms; ice storms; flooding). Therefore, it is desirable to be able to relatively quickly and easily remove at least a portion of the power pedestal in order to minimize damage that could otherwise be caused by the storm conditions. In an attempt to address this concern, one prior proposal has been to provide separable base and upper pedestal portions (e.g., housings) of the power pedestal. However, the aforementioned electrical components are typically hard-wired between these two portions, making it difficult to relatively quickly and easily separate them. Other known power pedestal designs incorporate a modular design in which some of the electrical components are substantially isolated in a relatively small module which is structured to be relatively quickly electrically connected and disconnected to and from, respectively, a corresponding receptacle disposed on the upper portion of the pedestal. While this enables some of the components of the power pedestal to be removed, for example, in anticipation of an imminent storm condition, the majority of the power pedestal remains exposed and thus is susceptible to potential damage caused the storm condition.

In an attempt to overcome the foregoing disadvantages, another prior proposal incorporates a plurality of electrical stabs and corresponding jaws in the upper pedestal portion and base portion, respectively, to enable the pedestal to be removed from the base. However, among other disadvantages, such a design increases the number of electrical and mechanical connections of the power pedestal. For example, each stab must be sufficiently electrically connected to its counterpart jaw, and the stabs and jaws must be suitably mechanically fastened to the corresponding base or upper pedestal portion. Stabs and jaws also present the potential for hot spots, arcing, and other electrical faults. This is particularly true, for example, if the pedestal is repetitively removed and installed with respect to the base, thereby decreasing the strength of the mechanical connection (e.g., press-fit) between the stabs and the jaws.

There is, therefore, room for improvement in power pedestals and in base assemblies therefor.

SUMMARY OF THE INVENTION

These needs and others are met by embodiments of the invention, which are directed to a base assembly for a power pedestal, which base assembly is structured to enable the majority of the power pedestal and electrical components thereof to be relatively quickly and easily removed, without compromising the integrity of the electrical and mechanical connections of the power pedestal during normal operation.

As one aspect of the invention, a base assembly is provided for a power pedestal including an elongated housing and a plurality of electrical conductors enclosable by the elongated housing. The elongated housing has a first end and a second end disposed opposite and distal from the first end. The base assembly comprises: a power pedestal base member comprising a first end and a second end disposed opposite and distal from the first end of the base member, the second end of the base member being structured to be coupled to a platform; and a connecting mechanism disposed at or about the first end of the base member and structured to removably couple the first end of the elongated housing to the base member without a number of separate fasteners, thereby facilitating removal of the elongated housing from the base member.

The base member may further comprise a mounting surface disposed on the first end of the base member, and an electrical bus mount removably coupled to the mounting surface. The electrical conductors may be a plurality of first electrical conductors and a plurality of second electrical conductors, wherein the first electrical conductors are structured to be substantially enclosed within the elongated housing and to be coupled to the electrical bus mount, and wherein at least one of the second electrical conductors is structured to extend from at or about the mounting surface and to be electrically connectable at the electrical bus mount to a corresponding one of the first electrical conductors. The first electrical conductors may be structured not to be independently directly connected to the base member, in order to further facilitate removal of the elongated housing and the first electrical conductors which are enclosed thereby.

The mounting surface of the base member may include a number of receptacles, and the electrical bus mount may include a number of tabs. At least one of the tabs may removably engage a corresponding one of the number of receptacles. When the elongated housing is removed from the base member, the electrical bus mount may be removable from the mounting surface of the base member, in order that the first electrical conductors and the electrical bus mount are structured to remain intact and to be removed with the elongated housing. The electrical bus mount may comprise a bottom end removably coupled to the mounting surface of the base member, a top end disposed opposite and distal from the bottom end, a first side, a second side, and a plurality of electrical terminals disposed at or about the top end. The first side may include a plurality of insulating barriers extending outwardly from the first side and further extending from at or about the top end toward the bottom end. Each of the insulating barriers may be disposed between a pair of the electrical terminals. At least one of the first electrical conductors may be structured to be electrically connected to a corresponding one of the electrical terminals of the electrical bus mount, and such one of the second electrical conductors may be structured to be electrically connectable at the corresponding one of the electrical terminals to the at least one of the first electrical conductors. The electrical bus mount may be a single-piece molded member wherein the bottom end, the top end, and the insulating barriers comprise molded portions of the single-piece molded member.

The connecting mechanism may comprise a hinge assembly, wherein the hinge assembly is structured to pivotably couple the base member to the first end of the elongated housing, in order that the elongated housing is pivotable with respect to the base member. The first end of the base member may have an edge, and the elongated housing may include at least one aperture disposed at or about the first end of the elongated housing. The hinge assembly may comprise at least one protrusion disposed at or about the edge of the first end of the base member and structured to be pivotably disposed in a corresponding one of the at least one aperture. The at least one aperture of the elongated housing may be a first recess and a second recess. The at least one protrusion may be a first molded hook and a second molded hook. The elongated housing may be pivotable among a first position in which the first molded hook is structured to pivotably engage the first recess and the second molded hook is structured to pivotably engage the second recess, and a second position in which the first molded hook is structured to be disengagable from the first recess and the second molded hook is structured to be disengagable from the second recess.

The base member may further comprise a removable cap wherein, when the elongated housing is removed from the base member, the removable cap is coupled to the base member in order to overlay the mounting surface.

As another aspect of the invention, a power pedestal comprises: an elongated housing including a first end and a second end disposed opposite and distal from the first end; a plurality of electrical conductors enclosable by the elongated housing; and a base assembly comprising: a base member comprising a first end and a second end disposed opposite and distal from the first end of the base member, and a connecting mechanism disposed at or about the first end of the base member and removably coupling the first end of the elongated housing to the base member without a number of separate fasteners, thereby facilitating removal of the elongated housing from the base member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
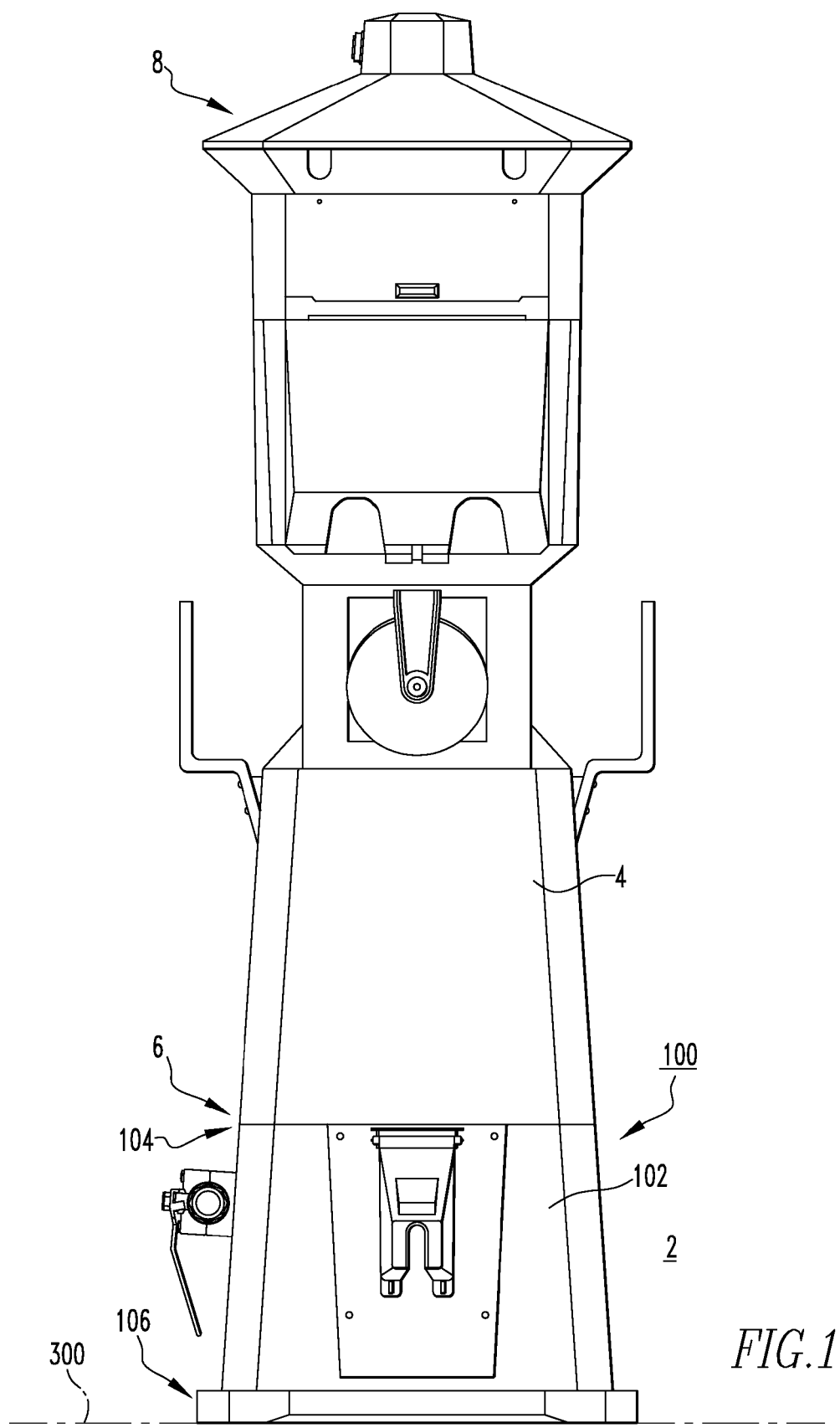
FIG. 1 is a front elevation view of a power pedestal and base assembly therefor, in accordance with an embodiment of the invention.

Directional phrases used herein, such as, for example, left, right, top, bottom, upward, downward, inward, outward and derivatives thereof, relate to the orientation of the elements shown in the drawings and are not limiting upon the claims unless expressly recited therein.

As employed herein, the term "pedestal" or "pedestal member" shall mean an elongated generally upright structure.

As employed herein, the term "power pedestal" refers to a pedestal or pedestal member structured to enclose electrical components (e.g., without limitation, contactors; circuit breakers; electric meters; transformers; light fixtures; power receptacles; telephones; telephone and/or Internet service lines and electrical connectors therefor; television cables and electrical connectors therefor), and to input power from input power terminals (e.g., without limitation, utility power terminals) and output power to a number of output power receptacles. The power pedestal thus provides a power center for providing plug-in power and/or connectivity (e.g., without limitation, telephone service; Internet service; cable television; water service), for example, for a vehicle, such as for example and without limitation, a watercraft, such as a boat, wherein the power pedestal is disposed at or about a body of water (e.g., without limitation, a suitable platform in a marina), or for a land-based vehicle, such as a recreational vehicle (RV), wherein the power pedestal is disposed on a suitable land-based foundation (e.g., without limitation, a suitable platform in a camp ground).

As employed herein, the term "platform" shall mean a horizontal flat surface, a raised horizontal flat surface, or a dock (e.g., without limitation, a floating dock; a stationary dock; a pier).

As employed herein, the terms "storm" and "storm condition" refer to any adverse environmental condition and expressly include, without limitation, weather phenomena such as, for example, hurricanes, tornadoes, cyclones, hail storms, thunderstorms, wind storms, ice storms, and adverse conditions associated with such weather phenomena such as, for example and without limitation, windy conditions, freezing conditions, precipitation, and flooding conditions.

As employed herein, the term "fastener" shall mean a separate element or elements which is/are employed to connect or tighten two or more components together, and expressly includes, without limitation, rivets, pins, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
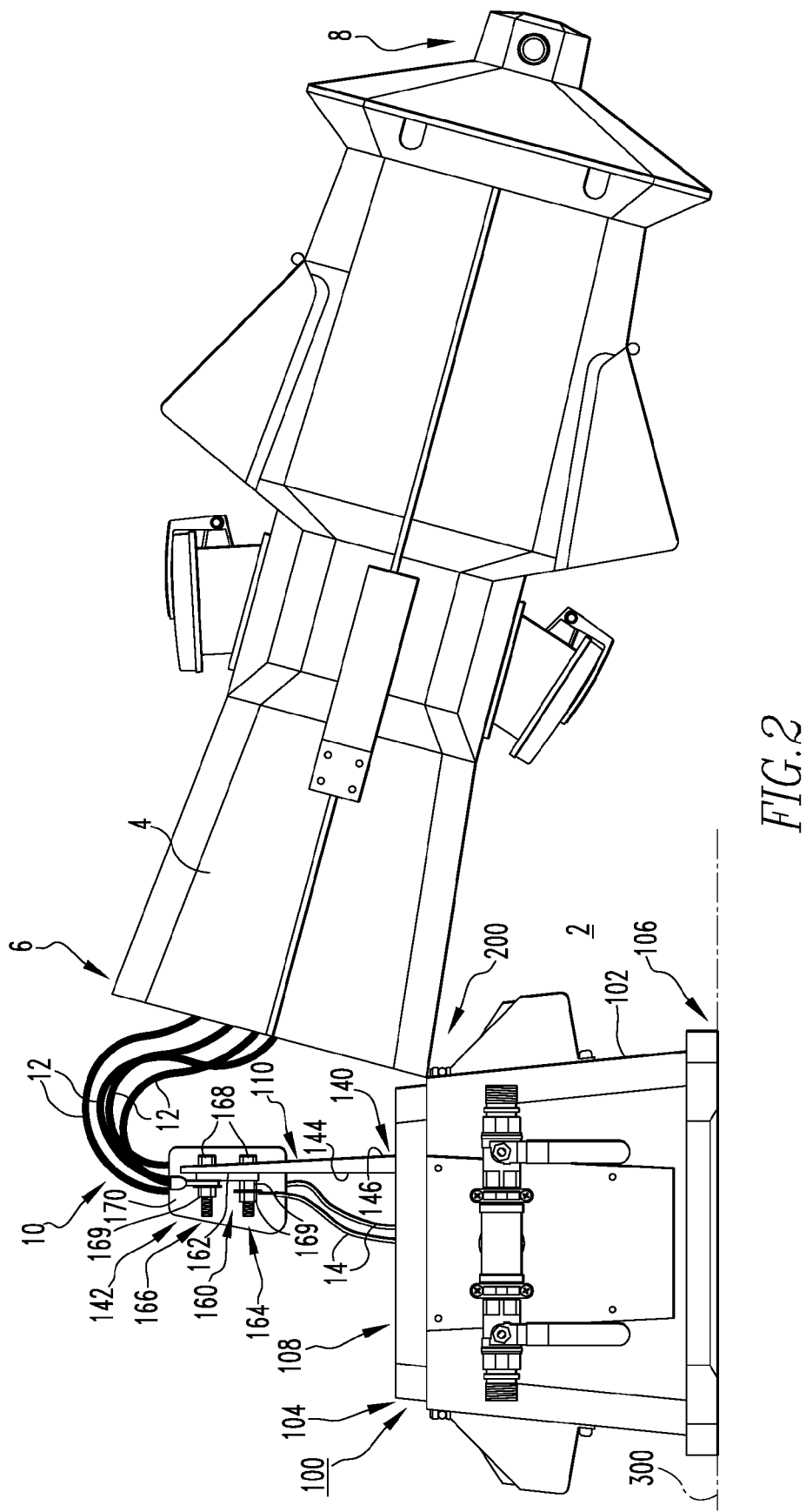
FIG. 2 is a side elevation view of the power pedestal and base assembly therefor of FIG. 1, modified to show the power pedestal in a pivoted position and an electrical bus mount in accordance with another embodiment of the invention.

FIGS. 1 and 2 show a power pedestal 2 and base assembly 100 therefor, which enables the majority (e.g., elongated housing 4 and electrical bus mount 110, discussed hereinbelow) of the power pedestal 2 to be relatively easily and quickly removed, for example, in anticipation of a storm condition, as defined herein. Thus, the disclosed base assembly 100 provides a mechanism for protecting the majority of the power pedestal 2 from damage which might otherwise result from the storm condition.

The power pedestal 2 includes the elongated housing 4 having a first end 6, and a second end 8 disposed opposite and distal from the first end 6. A plurality of electrical conductors 10, such as for example, the first and second electrical conductors 12,14 (e.g., without limitation, wires; cables) shown in FIG. 2, are enclosable by the elongated housing 4, when it is disposed in the vertical position shown in FIG. 1. The base assembly 100 includes a base member 102 having a first end 104 and a second end 106. The second end 106 of the base member 102 is structured to be coupled to a platform 300, as partially shown in phantom line drawing in FIGS. 1 and 2. A connecting mechanism, which in the example shown and described herein, is a hinge assembly 200, is disposed at or about the first end 104 of the base member 102, and is structured to removably couple the first end 6 of the elongated housing 4 to the base member 102, without a number of separate fasteners. In this manner, the hinge assembly 200 facilitates removal of the elongated housing 4 from the base member 102.

Figure 3:
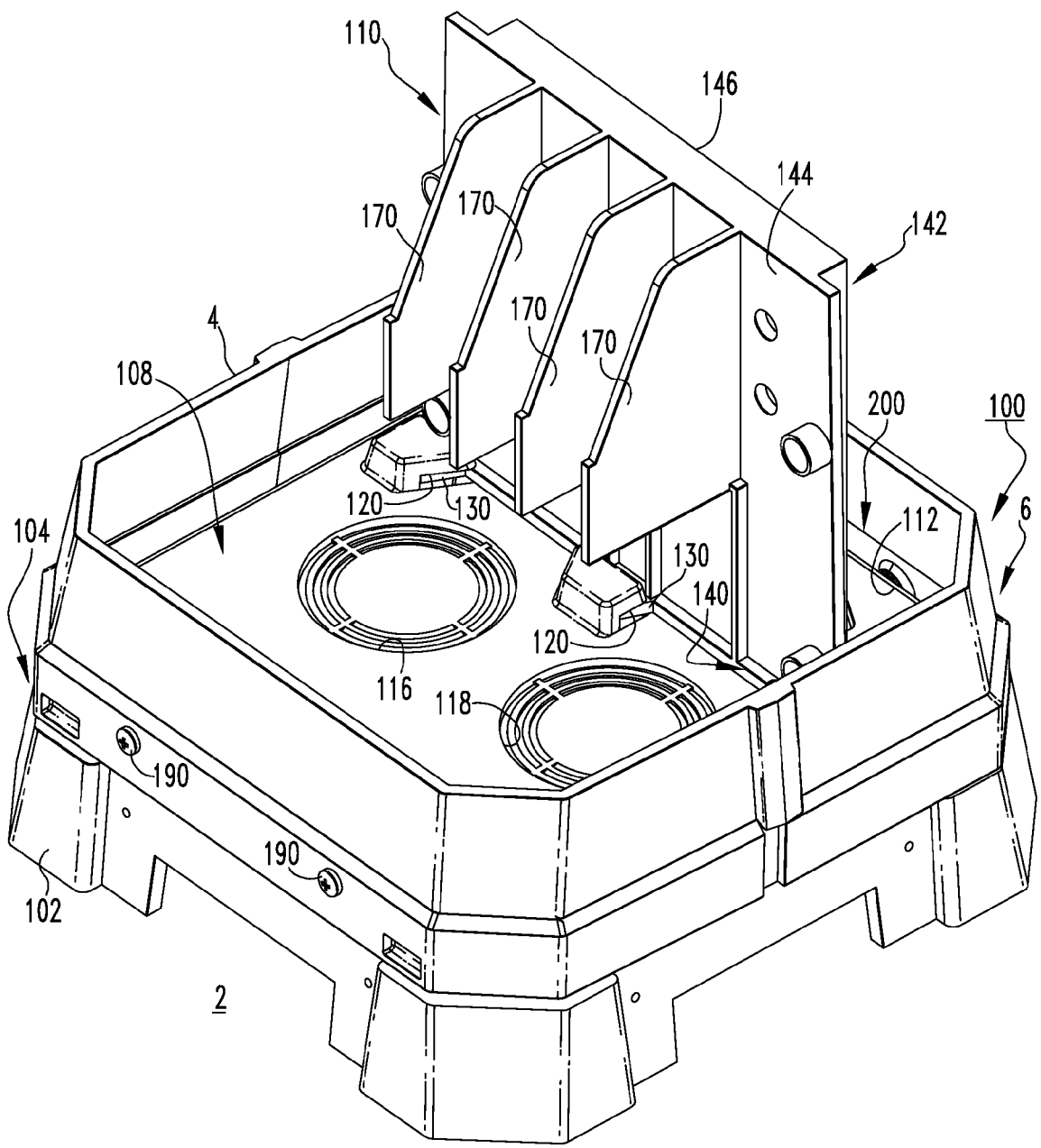
FIG. 3 is an isometric view of a portion of the power pedestal and a portion of the base assembly therefor of FIG. 2 with the remainder of the power pedestal and the remainder of the base assembly being cut-away to show the electrical bus mount.

As shown in FIG. 2, and also in FIGS. 3-5, 6A and 6B, the base member 102 further includes a mounting surface 108 disposed on the first end 104 thereof. An electrical bus mount 110 (not shown in FIGS. 6A and 6B; shown exploded away from the base member 102 in FIGS. 4 and 5), is removably coupled to the mounting surface 108, as shown in FIG. 3. As shown in FIG. 2, the first electrical conductors 12 are coupled to the electrical bus mount 110, and the second electrical conductors 14 (two are shown in FIG. 2) extend from below the mounting surface 108 and are electrically connected at the electrical bus mount 110 to corresponding first electrical conductors 12. More specifically, the mounting surface includes a number of knockouts 116,118 (two are shown in FIGS. 3-5 and 6A) which can be removed (not shown) in order to provide an opening for the second electrical conductors 14 (FIG. 2) to pass from below the mounting surface 108 to the terminals 160 (FIG. 2) on electrical bus mount 110. Accordingly, it will be appreciated that the first electrical conductors 12 are not independently directly connected to the base member 102. This aspect of the disclosed base assembly 100 further facilitates removal of the elongated housing 4, as well as the first electrical conductors 12, which are enclosed thereby.

More specifically, as will be discussed, in order to remove the elongated housing 4, the first electrical conductors 12 and the electrical bus mount 110, the elongated housing 4 merely needs to be pivoted (e.g., to the position shown in FIG. 2), and the second electrical conductors 14 are unfastened from the electrical bus mount 110. The electrical bus mount 110 can then be removed from the mounting surface 108, as will be described, in order that the first electrical conductors 12 and electrical bus mount 110 remain intact, and are removed with the elongated housing 4. It will be appreciated, for safety purposes, that suitable protective measures are preferably employed before or after unfastening the second electrical conductors 14 (e.g., without limitation, disconnection of utility power to those electrical conductors 14; electrically insulating the exposed conductive surfaces of the electrical conductors 14.

Figure 4:
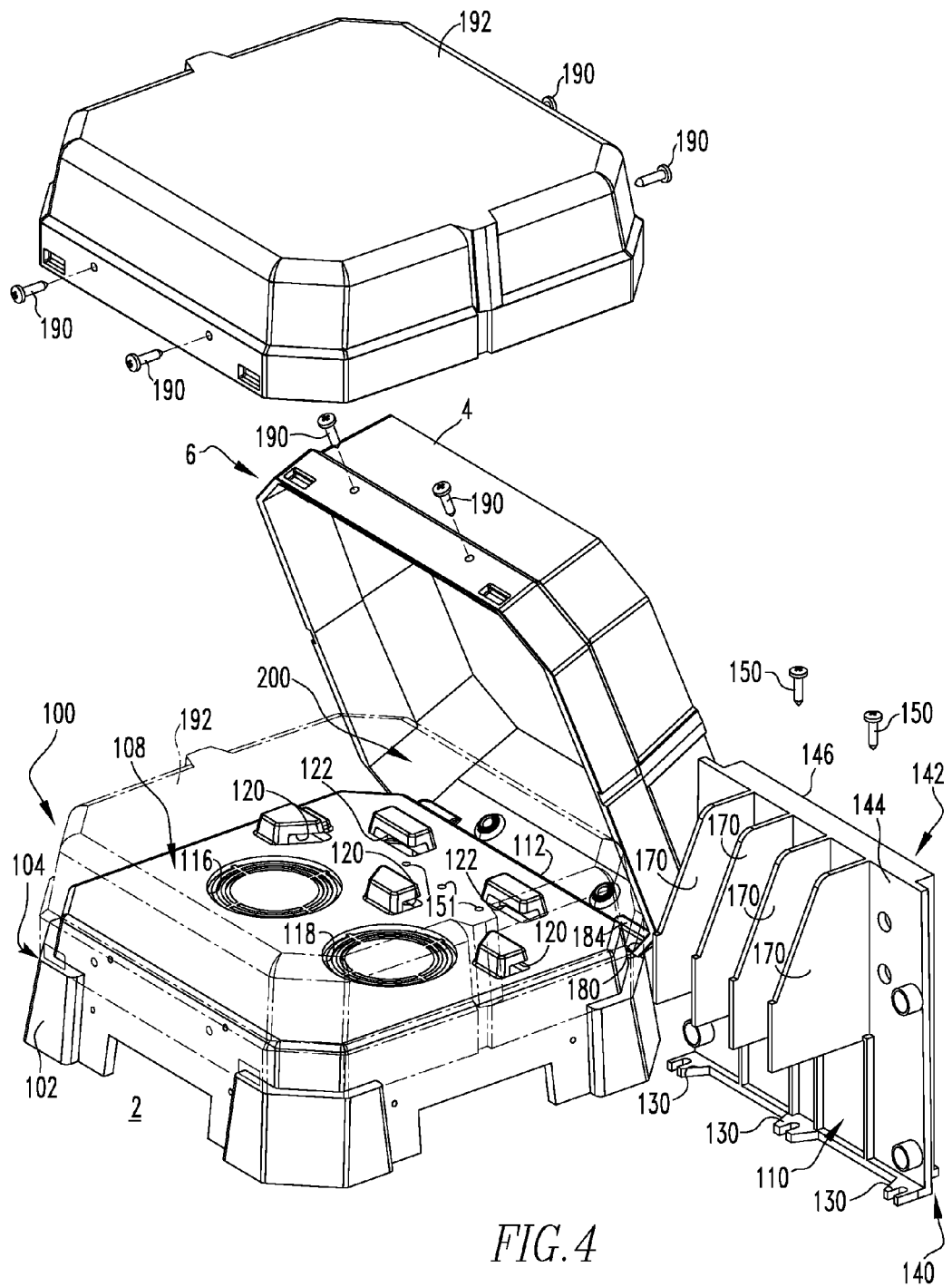
FIG. 4 is a partially exploded isometric view of the portion of the power pedestal and the portion of the base assembly and the electrical bus mount therefor of FIG. 3, also showing a cap member for the base assembly in accordance with an embodiment of the invention.
Figure 5:
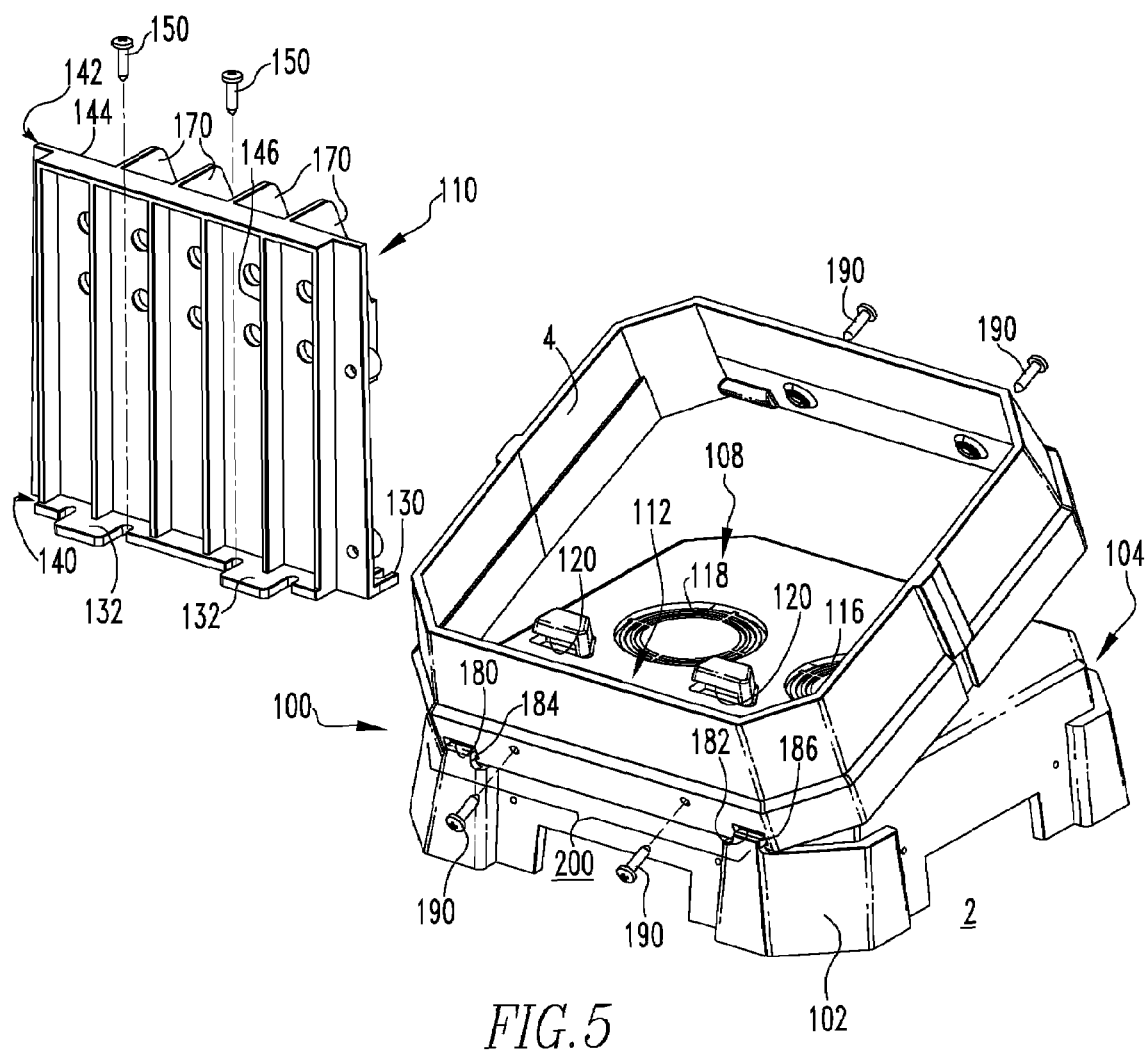
FIG. 5 is a partially exploded isometric view of the portion of the power pedestal and the portion of the base assembly and the electrical bus mount therefor of FIG. 4, with the cap member not being shown.

As shown in FIGS. 3-5, 6A and 6B, the mounting surface 108 of the base member 102 includes a number of receptacles 120,122 (receptacles 122 are only shown in FIGS. 4, 6A and 6B), and the electrical bus mount 110 (not shown in FIGS. 6A and 6B) includes a number of tabs 130,132 (tabs 132 are only shown in FIG. 5). At least one of the tabs 130,132 removably engages a corresponding one of the receptacles 120,122, in order to removably couple the electrical bus mount 110 to the mounting surface 108, as shown in FIG. 3. In the example shown and described herein, the receptacles are first molded receptacles 120 extending outwardly from the mounting surface 108 of the base member 102, and second molded receptacles 122 extending outwardly from the mounting surface 108 of the base member 102 opposite the first molded receptacles 120, as shown in FIG. 4. In particular, the example base member 102 includes three first molded receptacles 120 and two second molded receptacles 122. The example electrical bus mount 110 has three first molded tabs 130 (FIG. 4) and two second molded tabs 132 (FIG. 5). The three first molded tabs 130 removably engage the three first molded receptacles 120, as shown in FIG. 3 (two first molded tabs 130 and two first molded receptacles 120 are shown), and the two second molded tabs 132 removably engage (not expressly shown) the two second molded receptacles 122 (FIG. 4).

Figure 6A:
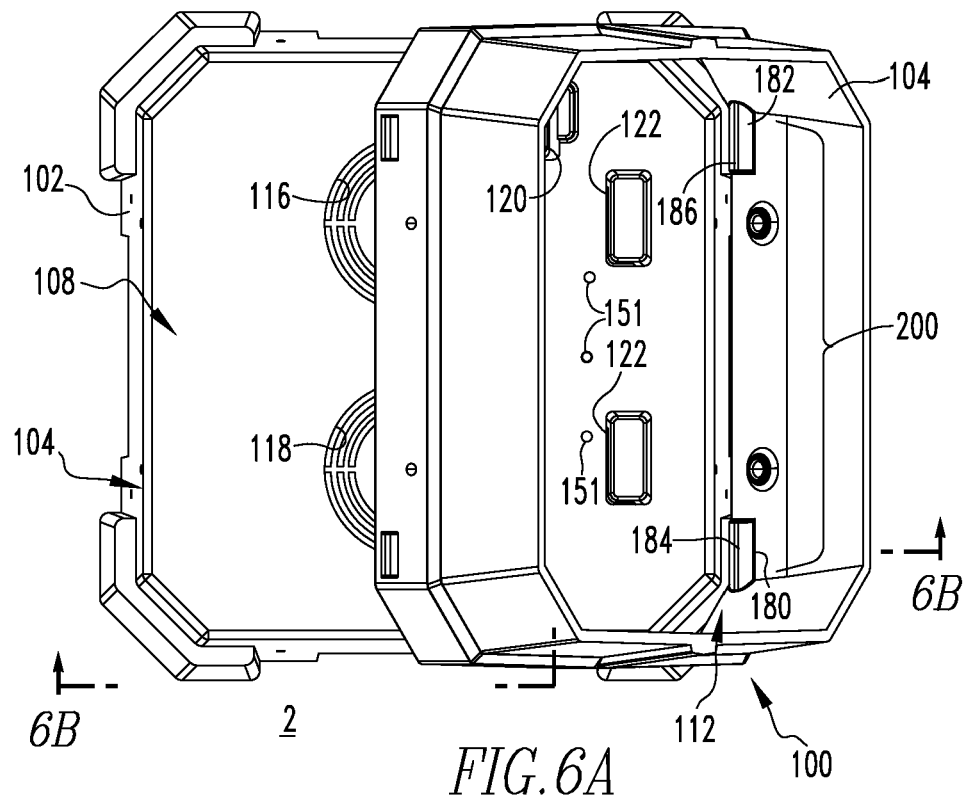
FIG. 6A is a top plan view of the portion of the power pedestal and the portion of the base assembly therefor of FIG. 5, with the electrical bus mount not being shown.
Figure 6B:
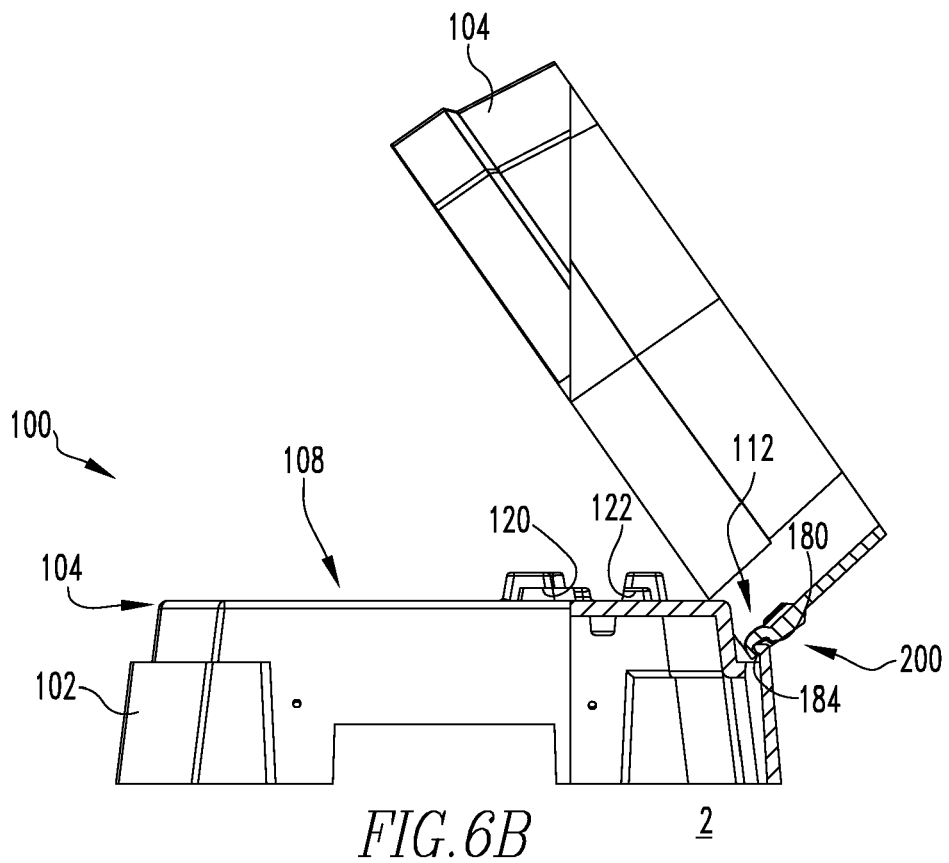
FIG. 6B is a side elevation partially sectioned view of the portion of the power pedestal and the portion of the base assembly therefor of FIG. 6A, with segment 6B of FIG. 6A being shown in section view.

As shown in FIGS. 2-5, the example electrical bus mount 110 includes a bottom end 140, a top end 142 disposed opposite and distal from the bottom end 140, a first side 144, and a second side 146. The aforementioned first and second molded tabs 130 (FIGS. 3 and 4) and 132 (FIG. 5) extend outwardly from the first and second sides 144 and 146, respectively, at or about the bottom end 140 of the electrical bus mount 110. As shown in FIGS. 4 and 5, the example electrical bus mount 110 further includes at least one fastener such as, for example and without limitation, the two screws 150, which are shown. The screws 150 may be fastened in order to fasten the tabs (e.g., second molded tabs 132) to the mounting surface 108 of the base member 102 at openings 151 (FIGS. 4 and 6A). It will, however, be appreciated that any known or suitable alternative fastener or fastening mechanism (not shown) could be employed to removably secure the electrical bus mount 110 to the base member 102. It will further be appreciated that no such fasteners 150 are required.

The example electrical bus mount 110 further includes a plurality of electrical terminals 160 (one electrical terminal 160 is shown in FIG. 2) disposed at or about the top end 142 of the electrical bus mount 110. Additionally, the first side 144 includes a plurality of insulating barriers 170, which extend outwardly from the first side 144 and further extend from at or about the top end 142, toward the bottom end 140. Each of the example insulating barriers 170 (four are shown in FIGS. 3-5) are disposed between a pair of the aforementioned electrical terminals 160 (only one electrical terminal 160 is shown in FIG. 2). It will, however, be appreciated that any known or suitable alternative number and/or configuration (not shown) of insulating barriers (e.g., 170) other than that which is shown and described herein, could be employed to effectively electrically insulate adjacent electrical terminals 160 (FIG. 2) on opposite sides of some of the barriers 170, without departing from the scope of the invention.

Referring again to FIG. 2, at least one of the first electrical conductors 12 is electrically connected to a corresponding one of the electrical terminals 160 of the electrical bus mount 110. One of the second conductors 14 is then electrically connectable at or about the corresponding electrical terminal 160, to the first electrical conductor 12, as shown. The electrical terminal 160 in the example of FIG. 2 consists of an electrically conductive (e.g., without limitation, suitably conductive metal) member 162 that electrically connects two fastener assemblies 164,166. Each of the example fastener assemblies 164,166 includes a bolt 168, and at least one nut 169. More specifically, the first electrical conductor 12 is electrically connected to the electrical terminal 160 by fastener assembly 166, between the elongated electrically conductive member 162 and a nut 169 thereof. The second electrical conductor 14 is electrically connected to the electrical terminal 160 between a pair of nuts 169 of fastener assembly 164. It will, however, be appreciated that any known or suitable alternative number and/or configuration (not shown) of components (e.g., without limitation, electrically conductive member 162; bolt 168; nut 169) could be employed to form a suitable electrical terminal (e.g., 160), without departing from the scope of the invention. It will also be appreciated that, although only one electrical terminal 160 is shown in FIG. 2, that the electrical bus mount 110 is contemplated as having any known or suitable number of electrical terminals 160, preferably with electrical barriers 170 disposed therebetween. It will, therefore, be further appreciated that the electrical bus mount 110 of the disclosed base assembly 100 provides a relatively quick and easy mechanism for electrically connecting and disconnecting the electrical conductors 10 of the power pedestal 2.

For simplicity of illustration, it will be appreciated that only a portion (e.g., top end 104) of the base member 102 of the base assembly 100, and a portion (e.g., first end 6) of the elongated housing 4 of the power pedestal 2, are shown in FIGS. 3-5, 6A and 6B. As shown in FIGS. 3-5, the base member 102 may optionally further include at least one fastener such as, for example and without limitation, the screws 190 which are shown. The screws 190, which are shown in the inserted and fastened position in FIG. 3, and in the exploded position in FIGS. 4 and 5, can be inserted through the first end 6 of the elongated housing 4 and fastened into the first end 104 of the base member 102, in order to secure the elongated housing in the vertical position, shown in FIG. 1. It will be appreciated that the screws 190 do not relate to the removably coupling aspect of the disclosed base assembly 100 and, in particular, the hinge assembly 200, discussed hereinbelow. Rather, the screws 190 function merely to further secure one member (e.g., elongated housing 4) to another member (e.g., base member 102) after the two members are already coupled together. It will also be appreciated that any known or suitable alternative fastener or fastening mechanism (not shown) could be employed in any suitable alternative number and/or configuration (not shown), without departing from the scope of the invention.

As shown in FIG. 4, the example base member 102 may further include a removable cap 192. The removable cap 192 is shown exploded away from the base member 102 in solid line drawing, and installed on the base member 102 in phantom line drawing. Specifically, when the elongated housing 4 is removed from the base member 102, as previously discussed, the removable cap 192 is structured to be coupled to the base member 102 in order to overlay the mounting surface 108 thereof. In this manner, the removable cap 192 protects (e.g., shields) the second electrical conductors 14 (FIG. 2) which extend outwardly from the mounting surface 108. Thus, although it will be appreciated that it is contemplated that electrical power to the power pedestal 2 would be cut-off prior to the elongated housing 4, first electrical conductors 12, and electrical bus mount 110 being removed, the removable cap 192 (FIG. 4) nonetheless provides a mechanism for relatively quickly and easily covering the mounting surface 108 of the base member 102 and features thereof, which would otherwise be left exposed to the elements.

As previously discussed, the connecting mechanism of the example base assembly 100, is hinge assembly 200. The hinge assembly 200 pivotably couples the base member 102 to the first end 6 of the elongated housing 4, in order that the elongated housing 4 is pivotable with respect to the base member 102, as shown in FIGS. 2, 4, 5, 6A and 6B. More specifically, the first end 104 of the base member 102 has an edge 112, and the elongated housing 4 includes at least one aperture 180,182 (best shown in FIG. 5) disposed at or about the first end 6 of the elongated housing 4. The hinge assembly 200 includes at least one protrusion 184,186 (best shown in FIG. 5) disposed at or about the edge 112 of the first end 104 of the base member 102. Each protrusion 184,186 is pivotably disposed in a corresponding one of the apertures 180,182, as shown in FIG. 5. More specifically, the apertures 180,182 of the example elongated housing 4 are first and second recesses 180,182, and the protrusions of the example hinge assembly 200, are first and second molded hooks 184,186. The elongated housing 4 is pivotable among a first position (FIGS. 1 and 3) in which the first molded hook 184 pivotably engages the first recess 180, and the second molded hook 186 pivotably engages the second recess 182, and a second position (FIG. 2) in which the first and second molded hooks 184,186 (both shown in FIGS. 5 and 6A) are disengagable from the first and second recesses 180,182 (both shown in FIGS. 5 and 6A), respectively, in order that the elongated housing 4 can be separated (not shown) and removed from the base assembly 100. In other words, when the disclosed elongated housing 4 is pivoted beyond a certain angle (e.g., without limitation, about 90 degrees; see, for example, FIG. 2) with respect to the mounting surface 108 of the base member 102 of the base assembly 100, the components (e.g., first and second molded hooks 184,186; first and second recesses 180,182) of the example hinge assembly 200 are disengagable to permit the elongated housing 4 to be separated from the base member 102 (see also the partial section view of the hinge assembly 200 and molded protrusion 184 and recess 180 thereof of FIG. 6B). It will be appreciated, that such separation can be achieved without requiring the use of any separate tools (e.g., without limitation, screwdriver) and without requiring the removal or unfastening of any additional separate fasteners or fastening mechanism.

The disclosed base assembly 100 further simplifies the removal process by enabling the first electrical conductors 12 and electrical bus mount 110 to remain intact, and, therefore, be removed along with the elongated housing 4, as previously discussed. To accomplish this, the aforementioned optional fasteners 150 (FIGS. 4 and 5) merely need to be loosened or removed, as necessary, and the second electrical conductors 14 (FIG. 2) disconnected from the electrical terminals 160 (FIG. 2). The tabs 130,132 (both shown in FIG. 5) can then be disengaged from the respective recesses 120,122 (both shown in FIG. 4) of the base member 102 of the base assembly 100, as previously discussed. Finally, after the housing 4, electrical conductors 12, and electrical bus mount 110 have been removed, the removable cap 192 can be installed on the base member 102, in order to overlay and protect the mounting surface 108 of the base member 102 and features thereof, as shown in phantom line drawing in FIG. 4. To secure the removable cap member 192, the screws 190, which are shown in exploded view in FIG. 4, can be inserted through the removable cap member 192, and fastened into the first end 104 of the base member 102.

Accordingly, the disclosed base assembly 100 provides a mechanism for relatively quickly and easily removing the majority (e.g., without limitation, elongated housing 4; first electrical conductors 12; electrical bus mount 110) of the power pedestal 2, for example, in order to protect the same in anticipation of a storm condition. A removable cap 192 is also provided to overlay and protect the remaining portion (e.g., base member 102) of the power pedestal 2, which would otherwise be left exposed to the elements.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A base assembly for a power pedestal including an elongated housing and a plurality of electrical conductors enclosable by said elongated housing, said elongated housing having a first end and a second end disposed opposite and distal from the first end, said base assembly comprising:
   a power pedestal base member comprising a first end and a second end disposed opposite and distal from the first end of said base member, the second end of said base member being structured to be coupled to a platform; and
   a connecting mechanism disposed at or about the first end of said base member and structured to removably couple the first end of said elongated housing to said base member without a number of separate fasteners, thereby facilitating removal of said elongated housing from said base member,
   wherein said base member further comprises a mounting surface disposed on the first end of said base member, and an electrical bus mount removably coupled to said mounting surface; wherein said electrical conductors are a plurality of first electrical conductors and a plurality of second electrical conductors; wherein said first electrical conductors are structured to be substantially enclosed within said elongated housing and to be coupled to said electrical bus mount; wherein each of said second electrical conductors is structured to extend from at or about said mounting surface and to be electrically connectable at said electrical bus mount to a corresponding one of said first electrical conductors; and wherein said first electrical conductors are structured not to be independently directly connected to said base member, in order to further facilitate removal of said elongated housing and said first electrical conductors which are enclosed thereby, and
   wherein said mounting surface of said base member includes a number of receptacles; wherein said electrical bus mount includes a number of tabs; wherein at least one of said number of tabs removably engages a corresponding one of said number of receptacles; and wherein, when said elongated housing is removed from said base member, said electrical bus mount is removable from said mounting surface of said base member, in order that said first electrical conductors and said electrical bus mount are structured to remain intact and to be removed with said elongated housing.

2. The base assembly of claim 1 wherein said number of receptacles is at least one first molded receptacle extending outwardly from said mounting surface of said base member and at least one second molded receptacle extending outwardly from said mounting surface of said base member; wherein said electrical bus mount includes a bottom end, a top end disposed opposite and distal from the bottom end, a first side, and a second side; wherein said number of tabs is at least one first molded tab extending laterally outwardly from the first side at or about the bottom end, and at least one second molded tab extending laterally outwardly from the second side at or about the bottom end; and wherein, when said electrical bus mount is coupled to said mounting surface of said base member, said at least one first molded tab removably engages a corresponding one of said at least one first molded receptacle, and said at least one second molded tab removably engages a corresponding one of said at least one second molded receptacle.

3. The base assembly of claim 2 wherein said at least one first molded receptacle is three first molded receptacles; wherein said at least one first molded tab is three molded tabs removably engaging said three first molded receptacles; wherein said at least one second molded receptacle is a pair of second molded receptacles disposed opposite said three first molded receptacles; and wherein said at least one second molded tab is a pair of second molded tabs removably engaging said pair of second molded receptacles.

4. The base assembly of claim 1 wherein said electrical bus mount further includes at least one fastener; and wherein said at least one fastener fastens said at least one of said number of said tabs to said mounting surface of said base member.

5. A power pedestal comprising:
   an elongated housing including a first end and a second end disposed opposite and distal from the first end;
   a plurality of electrical conductors enclosable by said elongated housing; and
   a base assembly comprising:
      a base member comprising a first end and a second end disposed opposite and distal from the first end of said base member, the second end of said base member being structured to be coupled to a platform, and
      a connecting mechanism disposed at or about the first end of said base member and removably coupling the first end of said elongated housing to said base member without a number of separate fasteners, thereby facilitating removal of said elongated housing from said base member,
      wherein said base member of said base assembly further comprises a mounting surface disposed on the first end of said base member, and an electrical bus mount removably coupled to said mounting surface; wherein said electrical conductors are a plurality of first electrical conductors and a plurality of second electrical conductors; wherein said first electrical conductors are substantially enclosed within said elongated housing and are coupled to said electrical bus mount; wherein each of said second electrical conductors extends from at or about said mounting surface and is electrically connectable at said electrical bus mount to a corresponding one of said first electrical conductors; and wherein said first electrical conductors are not independently directly connected to said base member, thereby further facilitating removal of said elongated housing and said first electrical conductors which are enclosed thereby, and wherein said mounting surface of said base member includes a number of receptacles; wherein said electrical bus mount includes a number of tabs; wherein at least one of said number of tabs removably engages a corresponding one of said number of receptacles; and wherein, when said elongated housing is removed from said base member, said electrical bus mount is removable from said mounting surface of said base member, in order that said first electrical conductors and said electrical bus mount remain intact and are removable with said elongated housing.

6. The power pedestal of claim 5 wherein said electrical bus mount of said base assembly further includes at least one fastener; and wherein said at least one fastener fastens said at least one of said number of said tabs to said mounting surface of said base member.

7. The power pedestal of claim 5 wherein said electrical bus mount comprises a bottom end removably coupled to said mounting surface of said base member, a top end disposed opposite and distal from the bottom end, a first side, a second side, and a plurality of electrical terminals disposed at or about the top end; wherein the first side includes a plurality of insulating barriers extending outwardly from the first side and further extending from at or about the top end toward the bottom end; wherein each of said insulating barriers is disposed between a pair of said electrical terminals; wherein at least one of said first electrical conductors is electrically connected to a corresponding one of said electrical terminals of said electrical bus mount; and wherein one of said second electrical conductors is electrically connectable at said corresponding one of said electrical terminals to said at least one of said first electrical conductors.

* * * * *